US012646292B2

(12) United States Patent (10) Patent No.: US 12,646,292 B2
Park et al. (45) Date of Patent: Jun. 2, 2026

(54) SURROUND SCENE PERCEPTION USING MULTIPLE SENSORS FOR AUTONOMOUS SYSTEMS AND APPLICATIONS

(71) Applicant: NVIDIA Corporation, Santa Clara, CA (US)

(72) Inventors: Minwoo Park, Saratoga, CA (US); Trung Pham, San Jose, CA (US); Junghyun Kwon, Santa Clara, CA (US); Sayed Mehdi Sajjadi Mohammadabadi, San Jose, CA (US); Bor-Jeng Chen, San Jose, CA (US); Xin Liu, Pleasanton, CA (US); Bala Siva Sashank Jujjavarapu, Sunnyvale, CA (US); Mehran Maghoumi, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 364 days.

(21) Appl. No.: 18/353,453

(22) Filed: Jul. 17, 2023

(65) Prior Publication Data

US 2024/0020953 A1 Jan. 18, 2024

Related U.S. Application Data

(60) Provisional application No. 63/389,828, filed on Jul. 15, 2022.

(51) Int. Cl.
| | |
|---|---|
| *G06V 10/77* | (2022.01) |
| *G06V 10/82* | (2022.01) |
| *G06V 20/56* | (2022.01) |

(52) U.S. Cl.
CPC .......... *G06V 10/7715* (2022.01); *G06V 10/82* (2022.01); *G06V 20/56* (2022.01)

(58) Field of Classification Search
CPC ..... G06V 10/7715; G06V 10/82; G06V 20/56
See application file for complete search history.

(56) References Cited

U.S. PATENT DOCUMENTS

| | | | | |
|---|---|---|---|---|
| 11,328,517 | B2 * | 5/2022 | Vaquero Gomez | .... G06V 20/10 |
| 11,397,242 | B1 * | 7/2022 | Zhang | .................. G06V 10/806 |

(Continued)

FOREIGN PATENT DOCUMENTS

WO 2024015632 A1 1/2024

OTHER PUBLICATIONS

Park, Minwoo; International Preliminary Report on Patentability for PCT Application No. PCT/US2023/027909, filed Jul. 17, 2023, mailed Jan. 30, 2025, 7 pgs.

(Continued)

*Primary Examiner* — Utpal D Shah
(74) *Attorney, Agent, or Firm* — IRON SUMMIT IP LLP

(57) ABSTRACT

In various examples, feature values corresponding to a plurality of views are transformed into feature values of a shared orientation or perspective to generate a feature map—such as a Bird's-Eye-View (BEV), top-down, orthogonally projected, and/or other shared perspective feature map type. Feature values corresponding to a region of a view may be transformed into feature values using a neural network. The feature values may be assigned to bins of a grid and values assigned to at least one same bin may be combined to generate one or more feature values for the feature map. To assign the transformed features to the bins, one or more portions of a view may be projected into one or more bins using polynomial curves. Radial and/or angular bins may be used to represent the environment for the feature map.

20 Claims, 12 Drawing Sheets

(56) References Cited

U.S. PATENT DOCUMENTS

| | | | | |
|---|---|---|---|---|
| 11,430,218 | B2 * | 8/2022 | Li | G06T 7/33 |
| 12,315,236 | B2 * | 5/2025 | Choi | G06V 10/82 |
| 12,412,403 | B2 * | 9/2025 | Rezaei | G06V 10/82 |
| 2014/0035775 | A1 | 2/2014 | Zeng et al. | |
| 2020/0160559 | A1 | 5/2020 | Urtasun et al. | |
| 2022/0035376 | A1 | 2/2022 | Laddah et al. | |
| 2022/0036650 | A1 * | 2/2022 | Gomez | G06V 10/82 |
| 2023/0082097 | A1 * | 3/2023 | Choi | G06V 20/56 |
| | | | | 382/156 |
| 2023/0260266 | A1 * | 8/2023 | Karasev | G06T 3/4038 |
| | | | | 382/104 |
| 2023/0267720 | A1 * | 8/2023 | Marvasti | G06V 20/56 |
| | | | | 382/155 |
| 2024/0312177 | A1 * | 9/2024 | Redford | G06V 10/44 |

OTHER PUBLICATIONS

Qi, Charles R., et al. "Frustum pointnets for 3d object detection from rgb-d data." Proceedings of the IEEE Conference on Computer Vision and Pattern Recognition. 2018. 15 Pages.

Godard, Clement et al: "Unsupervised Monocular Depth Estimation with Left-Right Consistency", IEEE Computer Society Conference on Computer Vision and Pattern Recognition. Proceedings, IEEE Computer Society, US, Jul. 21, 2017. pp. 6602-6611. 10 pgs.

Reiher, L., et al., "A Sim2Real Deep Learning Approach for the Transformation of Images from Multiple Vehicle-Mounted Cameras to a Semantically Segmented Image in Bird's Eye View," 23rd IEEE International Conference on Intelligent Transportation Systems (ITSC), pp. 7 (May 8, 2020).

Levi, et al.; "Stixelnet: A deep convolutional network for obstacle detection and road segmentation", 26th British Machine Vision Conference (BMVC) 2015.

Park, Minwoo; International Search Report and Written Opinion for PCT Application No. PCT/US2023/027909; filed Jul. 17, 2023, mailed Sep. 28, 2023, 10 pgs.

Zhang, et al.; "RVDet: Feature-level Fusion of Radar and Camera for Object Detection", 2021 IEEE Intelligent Trasportation Systems Conference (ITSC) Sep. 19-21, 2021, 7 pgs.

Wang, et al.: "MCF3D: Multi-Stage Complementary Fusion for Multi-Sensor 3D Object Detection," IEEE Access, vol. 7, Jul. 24, 2019, 14 pgs.

Brazil, et al.; "M3D-RPN: Monocular 3D Region Proposal Network for Object Detection," https://arxiv.org/abs/1907.06038; Aug. 11, 2019, 10 pgs.

Can, et al.; "Structured Bird's-eye-view Traffic Scene Understanding from Onboard Images," 2021 IEEE/CVF International Conference on Computer Vision (ICCV), pp. 15641-15650, 2021.

Chen, et al.; "Monocular 3D Object Detection for Autonomous Driving," in 2016 IEEE Conference on Computer Vision and Pattern Recognition (CVPR), pp. 2147-2156, 2016.

Chitta, et al.; "Neat: Neural Attention Fields for End-to-End Autonomous Driving," https://arxiv.org/abs/2109.04456; Sep. 9, 2021, 11 pgs.

Fu, et al.; "Deep Ordinal Regression Network for Monocular Depth Estimation," In 2018 IEEE/CVF Conference on Computer Vision and Pattern Recognition, pp. 2002-2011, 2018.

Hendy, et al.; "FISHING Net: Future Inference of Semantic Heatmaps in Grids," https://arxiv.org/abs/2006.09917; Jun. 17, 2020, 9 pgs.

Liu, et al.; "SMOKE: Single-stage Monocular 3D Object Detection via Keypoint Estimation," https://arxiv.org/abs/2002.10111; Feb. 24, 2020, 10 pgs.

Ma, et al.; "Accurate monocular 3D object Detection via color-embedded 3D reconstruction for autonomous driving," In ICCV, 2019, 10 pgs.

Mani, et al.; "Mono Lay Out: Amodal Scene Layout from a Single Image," 2020 IEEE Winter Conference on Applications of Computer Vision (WACV), 2020, 9 pgs.

Mousavian, et al.; "3D Bounding Box Estimation Using Deep Learning and Geometry, "https://arxiv.org/abs/1612.00496; Apr. 10, 2017, 10 pgs.

Ng, et al.; "BEV-Seg: Bird's Eye View Semantic Segmentation Using Geometry and Semantic Point Cloud," https://arxiv.org/abs/2006.11436; Jun. 23, 2020, 8 pgs.

Pan, et al.; "Cross-view Semantic Segmentation for Sensing Surroundings," https://arxiv.org/abs/1906.03560, Jun. 18, 2020, 7 pgs.

Philion, et al., "Lift, Splat, Shoot: Encoding Images from Arbitrary Camera Rigs by Implicitly Unprojecting to 3D," https://arxiv.org/abs/2008.05711, Aug. 13, 2020, 17 pgs.

Reading, et al.; "Categorical Depth Distribution Network for Monocular 3D Object Detection, "https://arxiv.org/abs/2103.01100, Mar. 23, 2021, 11 pgs.

Roddick, et al.; "Predicting semantic map representations from images using pyramid occupancy networks," https://arxiv.org/abs/2003.13402, Mar. 30, 2020, 11 pgs.

Roddick, et al.; "Orthographic feature transform for monocular 3d object detection," https://arxiv.org/abs/1811.08188, Nov. 20, 2018, 10 pgs.

Saha, et al.; "Enabling spatio-temporal aggregation in birds-eye-view vehicle estimation," in 2021 IEEE International Conference on Robotics and Automation (ICRA), 2021, 7 pgs.

Saha, et al.; "Translating images into maps," https://arxiv.org/abs/2110.00966, Mar. 20, 2022, 7 pgs.

Sanberg, et al.; "Free-Space detection with Self-supervised and online trained fully convolutional networks," https://arxiv.org/abs/1604.02316, Jan. 5, 2017, 8 pgs.

Scheck, et al.; "Where to drive: Free space detection with one fisheye camera," https://arxiv.org/abs/2011.05822, Nov. 11, 2020, 10 pgs.

Schulter, et al.; "Learning to look around objects for top-view representations of outdoor scenes," https://arxiv.org/abs/1803.10870; Mar. 28, 2018, 28 pgs.

Shi, et al.; "PointrRCNN: 3D object proposal generation and detection from point cloud," https://arxiv.org/abs/1812.04244, May 16, 2019, 10 pgs.

Sun, et al.; "What makes for end-to-end object detection?" https://arxiv.org/abs/2012.05780, Jul. 12, 2021, 15 pgs.

Wang, et al.; "Fully Convolutional One-Stage Monocular 3D Object Detection," https://arxiv.org/abs/2104.10956, Sep. 24, 2021, 11 pgs.

Wang, et al.; "Pseudo-Lidar from Visual Depth Estimation: Bridging the Gap in 3D Object Detection for Autonomous Driving," https://arxiv.org/abs/1812.07179, Feb. 22, 2020, 16 pgs.

Wang, et al.; "DETR3D: 3D Object Detection from Multi-View Images via 3D-to-2D Queries," https://arxiv.org/abs/2110.06922, Oct. 13, 2021, 12 pgs.

Wang, et al.; "DETR3D: 3D Object Detection from Multi-View Images via 3D-to-2D Queries," In 5th Annual Conference on Robot Learning, 2021, 12 pgs.

Yang, et al.; "PIXOR: Real-time 3D Object Detection from Point Clouds," https://arxiv.org/abs/1902.06326, Mar. 2, 2019, 10 pgs.

Yang, et al.; "Projecting Your View Attentively: Monocular Road Scene Layout Estimation Via Cross-View Transformation," In 2021 IEEE/CVF Conference on Computer Vision and Pattern Recognition (CVPR), 2021, 10 pgs.

Zhou, et al.; "Objects As Points," https://arxiv.org/abs/1904.07850, Apr. 25, 2019, 12 pgs.

Cao, et al.; "Surround-view Free Space Boundary Detection with Polar Representation," In Proceedings of the British Machine Vision Conference (BMVC). BMVA Press, Nov. 2021, 12 pgs.

* cited by examiner

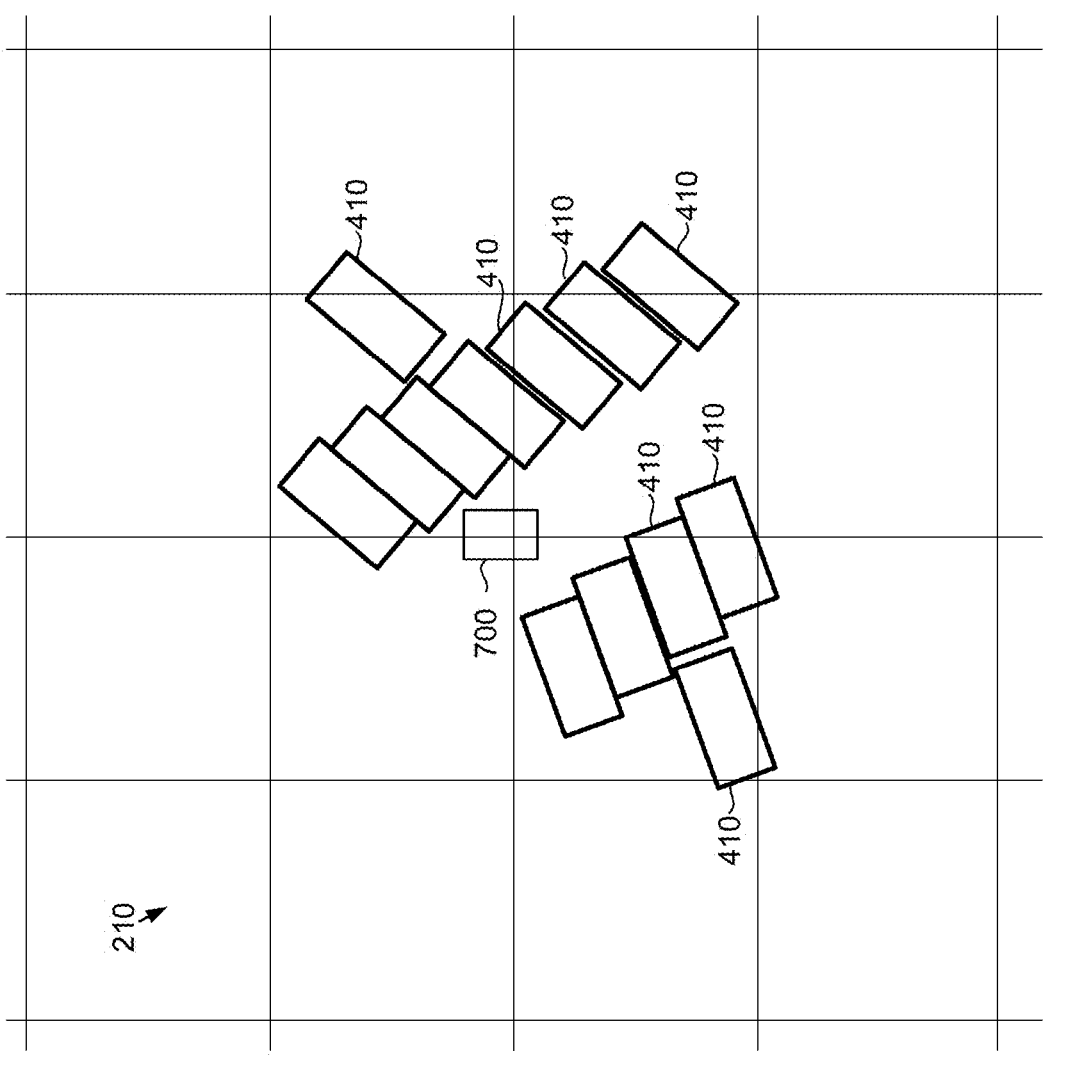
FIGURE 4

500

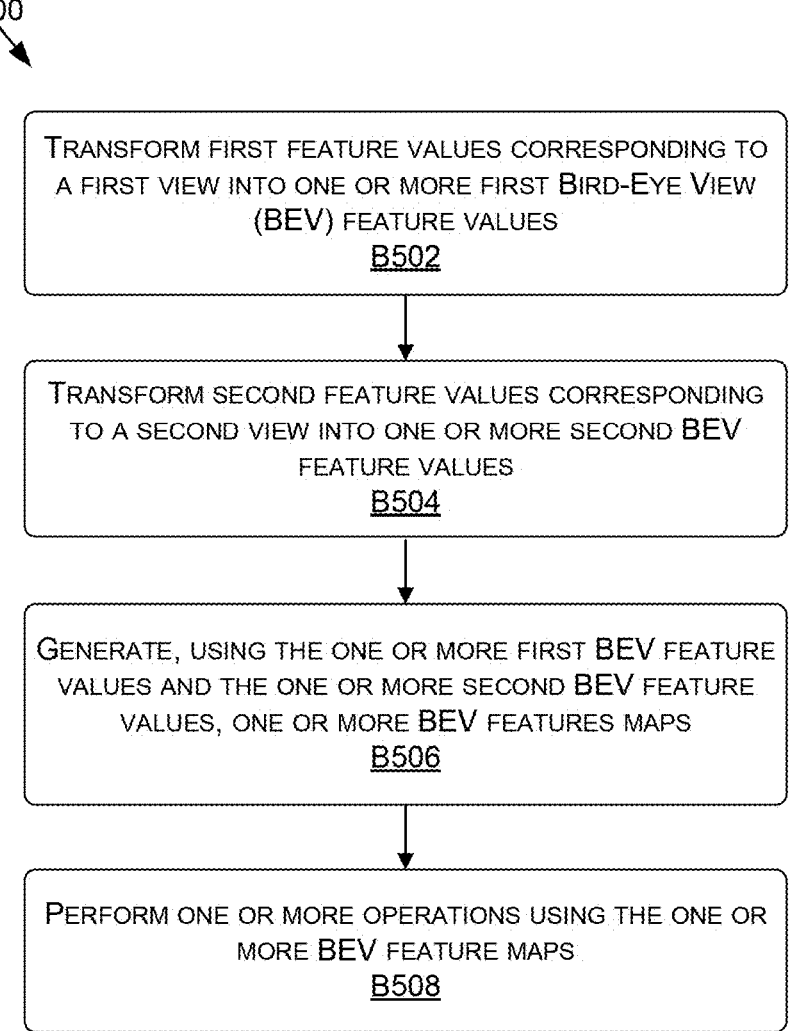

TRANSFORM FIRST FEATURE VALUES CORRESPONDING TO A FIRST VIEW INTO ONE OR MORE FIRST BIRD-EYE VIEW (BEV) FEATURE VALUES
B502

TRANSFORM SECOND FEATURE VALUES CORRESPONDING TO A SECOND VIEW INTO ONE OR MORE SECOND BEV FEATURE VALUES
B504

GENERATE, USING THE ONE OR MORE FIRST BEV FEATURE VALUES AND THE ONE OR MORE SECOND BEV FEATURE VALUES, ONE OR MORE BEV FEATURES MAPS
B506

PERFORM ONE OR MORE OPERATIONS USING THE ONE OR MORE BEV FEATURE MAPS
B508

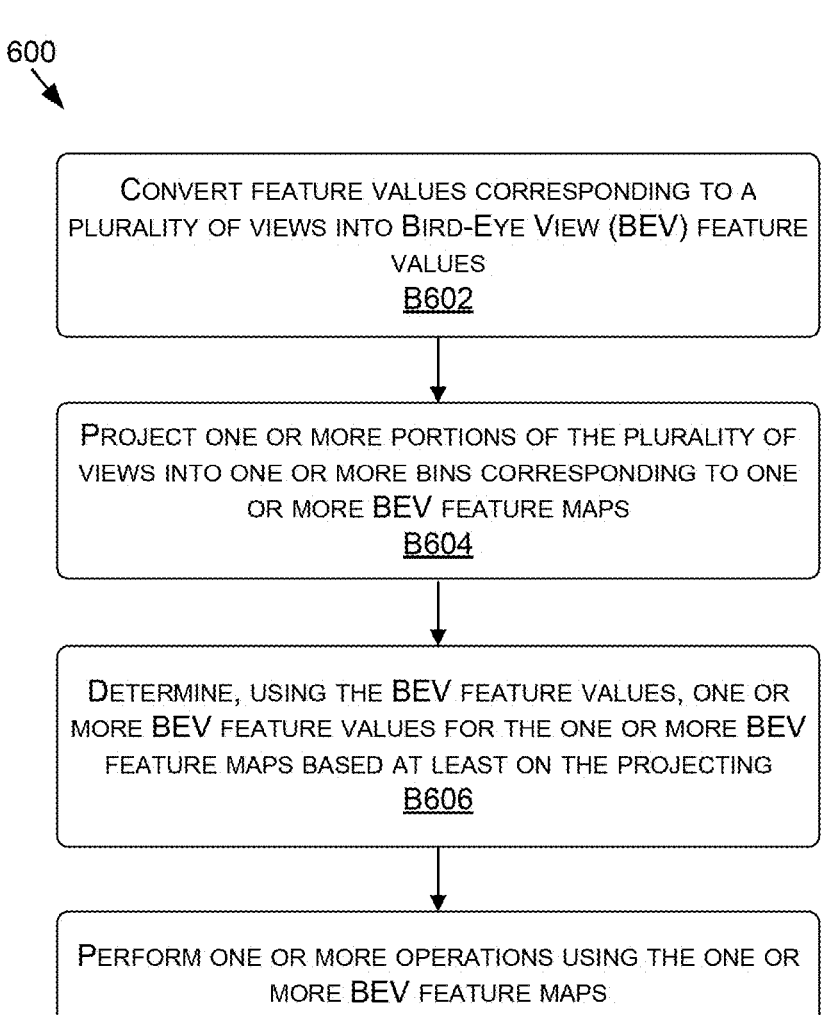

CONVERT FEATURE VALUES CORRESPONDING TO A
PLURALITY OF VIEWS INTO BIRD-EYE VIEW (BEV) FEATURE
VALUES
B602

PROJECT ONE OR MORE PORTIONS OF THE PLURALITY OF
VIEWS INTO ONE OR MORE BINS CORRESPONDING TO ONE
OR MORE BEV FEATURE MAPS
B604

DETERMINE, USING THE BEV FEATURE VALUES, ONE OR
MORE BEV FEATURE VALUES FOR THE ONE OR MORE BEV
FEATURE MAPS BASED AT LEAST ON THE PROJECTING
B606

PERFORM ONE OR MORE OPERATIONS USING THE ONE OR
MORE BEV FEATURE MAPS
B608

FIGURE 6

SERVER(S) 778

CPU 780(B)

CPU 780(A)

PCIE SWITCH 782(D)

PCIE SWITCH 782(C)

PCIE SWITCH 782(B)

PCIE SWITCH 782(A)

GPU 784(F)

GPU 784(H)

GPU 784(E)

GPU 784(G)

GPU 784(B)

GPU 784(D)

GPU 784(A)

GPU 784(C)

786

788

700

794

792

NETWORK(S) 790

776

800

MEMORY
804

I/O COMPONENTS
814

CPU(s)
806

POWER SUPPLY
816

GPU(s)
808

PRESENTATION
COMPONENT(S)
818

COMM. INTERFACE
810

LOGIC UNIT(S)
820

I/O PORT(S)
812

802

900

SURROUND SCENE PERCEPTION USING MULTIPLE SENSORS FOR AUTONOMOUS SYSTEMS AND APPLICATIONS

CROSS-REFERENCE TO RELATED APPLICATIONS

This application claims the benefit of U.S. Provisional Application No. 63/389,828, filed on Jul. 15, 2022, which is hereby incorporated by reference in its entirety.

BACKGROUND

It is often critical for autonomous vehicles to precisely perceive a three-dimensional (3D) environment for advanced driver assistance systems (ADAS), semi-autonomous systems, and/or autonomous systems. For example, multi-camera and multi-RADAR systems have become prevalent to provide full surround perception for ADAS. Typically, to provide full surround perception, a perception module is provided for each camera which independently performs perception for a corresponding camera. Perception outputs from each perception module are then combined using late fusion to produce a set of fused perception outputs. However, single camera perception of a 3D environment is prone to prediction errors due to, for example, limited depth information, ambiguous visual cues from occlusions, and/or a limited field of view. The prediction errors from each perception module are different and often unknowable. As a result, the errors can propagate to the fused perception outputs to cause false positive detections or other perception errors.

An early fusion approach to multi-camera perception uses images from different cameras as inputs to a single perception model that produces a single set of output signals. However, if one or more of the cameras become unavailable or is otherwise compromised, the perception model may no longer operate properly—e.g., at least one source of input relied upon by the perception model may no longer be valid. Additionally, the single perception model must be customized to a particular camera configuration—including the number of cameras, camera mounting angles, camera positions, camera radial distortions, and camera focal lengths. Thus, for example, a different perception model may be needed for each of a sports utility vehicle (SUV), a sedan, a low-profile sports car, or a pick-up truck due to significantly different camera mounting positions and/or other requirements.

SUMMARY

Embodiments of the present disclosure relate to surround scene perception using multiple sensors for autonomous or semi-autonomous systems and applications. Systems and methods are disclosed that may fuse top-down, birds-eye view (BEV), and/or otherwise oriented transformations of features that correspond to a plurality of views of an environment into a (e.g., top-down, BEV, etc.) feature map. One or more machine learning models (MLMs)— such as one or more deep neural networks (DNNs)— may use the feature map to predict one or more outputs corresponding to the environment.

In contrast to conventional systems, such as those described above, feature values corresponding to a plurality of views of an environment may be transformed into (e.g., top-down, BEV, etc.) feature values and the feature values may be used to generate a (e.g., top-down, BEV, etc.) feature map. The feature map may be generated based at least on relative positions of the sensors in the environment corresponding to the plurality of views. In at least one embodiment, a set of the feature values corresponding to a region of a view is transformed into a corresponding set of the feature values using a multilayer perceptron (MLP) network. Generating a feature map may be based at least on assigning the transformed feature values to one or more bins corresponding to the feature maps. Feature values that are assigned to at least one same bin may be combined to generate one or more feature values for the feature map. To assign the transformed features to the bins, one or more portions of a view may be projected into one or more bins using, for example, polynomial curves. In embodiments, radial and/or angular bins may be used to represent the environment for the feature map. The bins may be defined using an irregular grid where cell size may increase relative to a distance of a cell to a machine.

BRIEF DESCRIPTION OF THE DRAWINGS

The present systems and methods for surround scene perception using multiple sensors for autonomous or semi-autonomous systems are described in detail below with reference to the attached drawing figures, wherein:

FIG. 4 is a BEV illustrating examples of parking space predictions made using fused features corresponding to a BEV plane, in accordance with some embodiments of the present disclosure;

FIG. 5 is a flow diagram showing a method for surround scene perception based at on generating a BEV feature map corresponding to BEV features values transformed from feature values corresponding to multiple views, in accordance with some embodiments of the present disclosure;

FIG. 6 is a flow diagram showing a method for surround scene perception based at on projecting BEV features values converted from feature values corresponding to multiple views to determine a BEV feature map, in accordance with some embodiments of the present disclosure;

DETAILED DESCRIPTION

Figure 1:
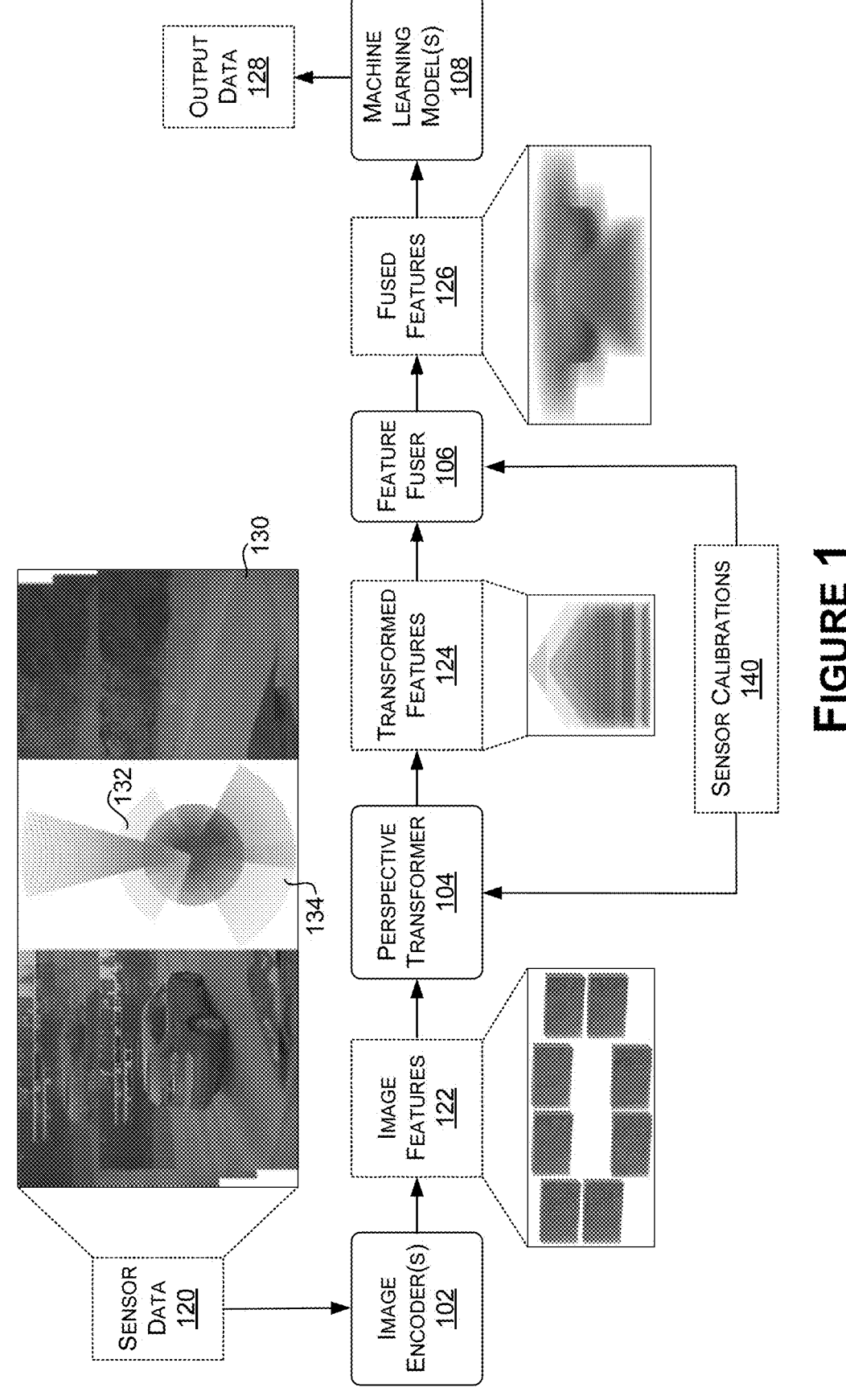
FIG. 1 is an example of a process for surround scene perception, in accordance with some embodiments of the present disclosure.

Systems and methods are disclosed related to surround three-dimensional perception using multiple sensors for autonomous or semi-autonomous systems and applications. Although the present disclosure may be described with respect to an example autonomous or semi-autonomous vehicle 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous or machines vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to environmental perception, this is not intended to be limiting, and the systems and methods described herein may be used in augmented reality, virtual reality, mixed reality, robotics, security and surveillance, autonomous or semi-autonomous machine applications, and/or any other technology spaces where sensor data may be used.

In one or more embodiments, feature values (e.g., of 2D image feature maps) corresponding to a plurality of views of (one or more portions of) an environment may be transformed into BEV feature values and the BEV feature values may be used to generate a BEV feature map. Although primarily described as BEV feature values and maps herein, this is not intended to be limiting, and the feature maps may otherwise be top-down, orthogonal, projection (to other than top-down or BEV), and/or of a different shared orientation/perspective. The BEV feature map may be generated based at least on relative positions of the sensors in the environment (e.g., camera positions) corresponding to the plurality of views. In at least one embodiment, a set of the feature values corresponding to a region of a view, such as an image column, is transformed into a corresponding set of the BEV feature values using a multilayer perceptron (MLP) network. The MLP network encodes global contextual information with respect to the region—providing for accurate transformation when objects appear at different heights in the view.

In at least one embodiment, the feature values may be generated using an image encoder which encodes a 2D image feature map for each image corresponding to a view of the plurality of views. One or more of the image feature maps (and/or other sensor modality feature maps) may be used for other purposes, such as independent perception, late fusion, and/or other tasks.

In at least one embodiment, generating a BEV feature map may be based at least on assigning the transformed BEV feature values to one or more bins corresponding to the BEV feature maps. BEV feature values that are assigned to at least one same bin may be combined to generate one or more BEV feature values for the BEV feature map. For example, the BEV feature values may be statistically combined using a sum operation and/or other statistical operation to determine a BEV feature value to include in the BEV feature map. By combining the BEV feature values rather than concatenating them, the BEV feature map may be robust to camera dropout, for example, when images used to generate the BEV feature map become unavailable. In further aspects, to assign the transformed BEV features to the bins, one or more portions of a view, such as a column and/or pixel cells, may be projected into one or more bins based at least on the relative positions in the environment corresponding to the plurality of views. The projections may be computed using polynomial curves to more accurately model distortion due to camera or sensor intrinsic and/or extrinsic attributes.

In at least one embodiment, one or more of the bins may include radial and/or angular bins (e.g., polar coordinate-based bins). Using radial and/or angular bins to spatially represent the environment for the BEV feature map may significantly reduce the quantity of bins needed to represent the environment, thereby reducing memory and computational requirements. Additionally, or alternatively, the bins may be defined using an irregular grid having non-uniform cell or bin sizes. For example, cell size may increase relative to a distance of a cell from a reference point(s) corresponding to a machine to provide higher resolution for distances closer to the machine relative to farther distances.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems implementing—or for performing operations using—a large language model (LLM), and/or other types of systems.

With reference to FIG. 1, FIG. 1 is an example of a process 100 for surround scene perception, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

The process 100 may be implemented using, amongst additional or alternative components, an image encoder(s) 102, a perspective transformer(s) 104, a feature fuser(s) 106, and a machine learning model(s) 108.

The image encoder 102 (or more generally, sensor data encoder 102) may be configured to receive sensor data corresponding to a plurality of sensors and/or views (e.g., perspective views) of an environment, such as sensor data 120. The image encoder 102 may further be configured to encode, using the sensor data, image features (e.g., one or more feature maps), such as image features 122 corresponding to the plurality of sensors and/or views of the environment. The image encoder 102 may be configured to provide the image features to the perspective transformer 104. The perspective transformer 104 may be configured to receive the images features from the image encoder 102. The perspective transformer 104 may further be configured to transform the image features to one or more other perspectives, such as BEV perspectives, to generate transformed features corresponding to the one or more other perspectives, such as the transformed features 124. The perspective transformer 104 may also be configured to provide the transformed features to the feature fuser 106.

The feature fuser 106 may be configured to receive the transformed features from the perspective transformer 104. The feature fuser 106 may further be configured to fuse the transformed features to generate fused features, such as the fused features 126, corresponding to a shared view of the environment, such as a BEV of the environment. The feature fuser 106 may also be configured to provide the fused features (e.g., one or more feature maps) to the MLM 108. The MLM 108 may be configured to receive the fused features from the feature fuser 106. The MLM 108 may further be configured to use the fused features to generate output data, such as output data 128. For example, the MLM 108 may use the fused features predict one or more outputs corresponding to the environment. The output data may be used by a machine, such as the vehicle 700, to perform one or more operations, such as one or more control operations and/or ADAS operations.

The sensor data 120 may be generated using one or more sensors, such as any combination of the various sensors described herein. In one or more embodiments, the sensors may include at least one of one or more physical sensors in a physical environment or one or more virtual sensors in a simulated environment. For example, the one or more sensors may correspond to a physical or simulated version of the vehicle 700, as described herein, or another machine and/or robot.

The sensor data 120 may include, without limitation, sensor data from any of the sensors of the vehicle 700 (and/or other vehicles or objects, such as robotic devices, VR systems, AR systems, etc., in some examples). For example, and with reference to FIGS. 7A-7C, the sensor data 120 may include data generated by or using, without limitation, global navigation satellite systems (GNSS) sensor(s) 758 (e.g., Global Positioning System sensor(s), differential GPS (DGPS), etc.), RADAR sensor(s) 760, ultrasonic sensor(s) 762, LIDAR sensor(s) 764, inertial measurement unit (IMU) sensor(s) 766 (e.g., accelerometer(s), gyro scope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700 and/or distance traveled), and/or other sensor types.

In some examples, the sensor data 120 may include sensor data generated using one or more forward-facing sensors, side-view sensors, downward-facing sensors, upward-facing sensors, and/or rear-view sensors. This sensor data may be useful for identifying, detecting, classifying, and/or tracking movement of objects around the vehicle 700 within the environment. In embodiments, any number of sensors may be used to incorporate multiple fields of view (e.g., the fields of view of the long-range cameras 798, the forward-facing stereo camera 768, and/or the forward facing wide-view camera 770 of FIG. 7B) and/or sensory fields (e.g., of a LIDAR sensor 764, a RADAR sensor 760, etc.). As used herein, the sensor data 120 or portions of sensor data may reference unprocessed sensor data, pre-processed sensor data, or a combination thereof.

The sensor data 120 may include image data representing an image(s), image data representing a video (e.g., snapshots of video), data representing sensory fields of sensors (e.g., depth maps for LIDAR sensors, a value graph for ultrasonic sensors, etc.), and/or data representing measurements of sensors. Where the sensor data 120 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 120 may be used without any pre-processing (e.g., in a raw or captured format), while in other examples, at least some of the sensor data 120 may undergo pre-processing (e.g., noise balancing, demosaicing, scaling, cropping, augmentation, white balancing, tone curve adjustment, etc., such as using a sensor data pre-processor (not shown)).

In the example of FIG. 1, the sensor data 120 represents images (e.g., video frames) corresponding to perspective views of cameras mounted to the vehicle 700, examples of which are described herein. Each camera and/or view may provide one or more images for input to the image encoder 102. For example, FIG. 1 shows a non-limiting example where there are eight views (fields of view) corresponding to eight cameras and images, such as an image 130 corresponding to a view 132 of a camera (e.g., long-range and/or mid-range camera(s) 798). In at least one embodiment, one or more sets of the images provided to the image encoder 102 may be time-synchronized using any suitable approach. For example, the set of images shown in FIG. 1 (that include the image 130) may be time-synchronized and provided to the image encoder 102 to generate the image features 122 for the set of images. The set of images may be time synchronized using any suitable approach. As indicated in FIG. 1, the set of images and/or views may be configured to collectively capture one or more portions of a 360-degree field of view of the environment and the views may or may not be at least partially overlapping.

As described herein, the image encoder(s) 102 (e.g., one or more 2D image encoders) may be configured to encode, using the sensor data 120, the image features 122 (e.g., image feature maps). In at least one embodiment, the image encoder 102 receives, as input, image data corresponding to a collection of $N_{view}$ camera images $$\{I_i\}_{i=1}^{N_{view}}.$$

The image encoder 102 may encode each image and/or frame $\{I_i\}$ of an input set of the sensor data 120 to generate corresponding input features 122 (e.g., 2D image features). In at least one embodiment, the image encoder 120 includes a multi-channel encoder having one channel for each input image and/or camera or view. In at least one embodiment, a separate image encoder 120 is provided for each input image and/or camera or view. In one or more embodiments, the image encoder 102 independently encodes each input image. As shown in FIG. 1, in the example where there are eight input images, the image encoder(s) 102 may encoder eight sets of image features, one set for each image. As a further example, the image encoder 102 may jointly encode one or more of the input images. However, the process 100 may be more robust to camera dropout when images from the cameras are independently encoded.

In at least one embodiment, the image encoder 102 may be implemented using one or more machine learning models (MLMs). For example and without limitation, any of the various MLMs described herein may include one or more of any type(s) of machine learning model(s), such as a machine learning model using linear regression, logistic regression, decision trees, support vector machines (SVM), Naïve Bayes, k-nearest neighbor (Knn), K means clustering, control barrier functions, random forest, dimensionality reduction algorithms, gradient boosting algorithms, neural networks (e.g., one or more auto-encoders, convolutional, recurrent, perceptrons, Long/Short Term Memory (LSTM), Hopfield, Boltzmann, deep belief, deconvolutional, generative adversarial, liquid state machine, generative, etc. neural networks), and/or other types of machine learning model.

In at least one embodiment, the image encoders 102 are implemented using a convolutional architecture for real-time or near real-time performance. The image encoder 102 may include a Convolutional Neural Network (CNN) backbone including a series of CNN blocks. Each CNN block may be defined using a kernel size, a stride, a number of channels and/or repeat parameters. The parameters may be optimized using hardware-aware neural architectural search to balance the trade-off between latency and accuracy. Residual connections may be removed for higher latency. Coarser feature maps may be upsampled and merged with finer feature maps to form multi-level semantically rich feature maps.

The perspective transformer 104 may be configured to transform the image features 122 the transformed features 124 having one or more other perspectives than one or more of the views captured by the sensor data 120. Transforming the image features 122 may include the perspective transformer 104 uplifting one or more of the image features 122 based at least on one or more additional dimensions. For example, where the image features 122 correspond to 2D images (e.g., x and y dimensions in image space), the perspective transformer 104 may uplift the image features 122 to reflect one or more other dimensions (e.g., a z dimension relative to image space).

Figures 2A, 2B:
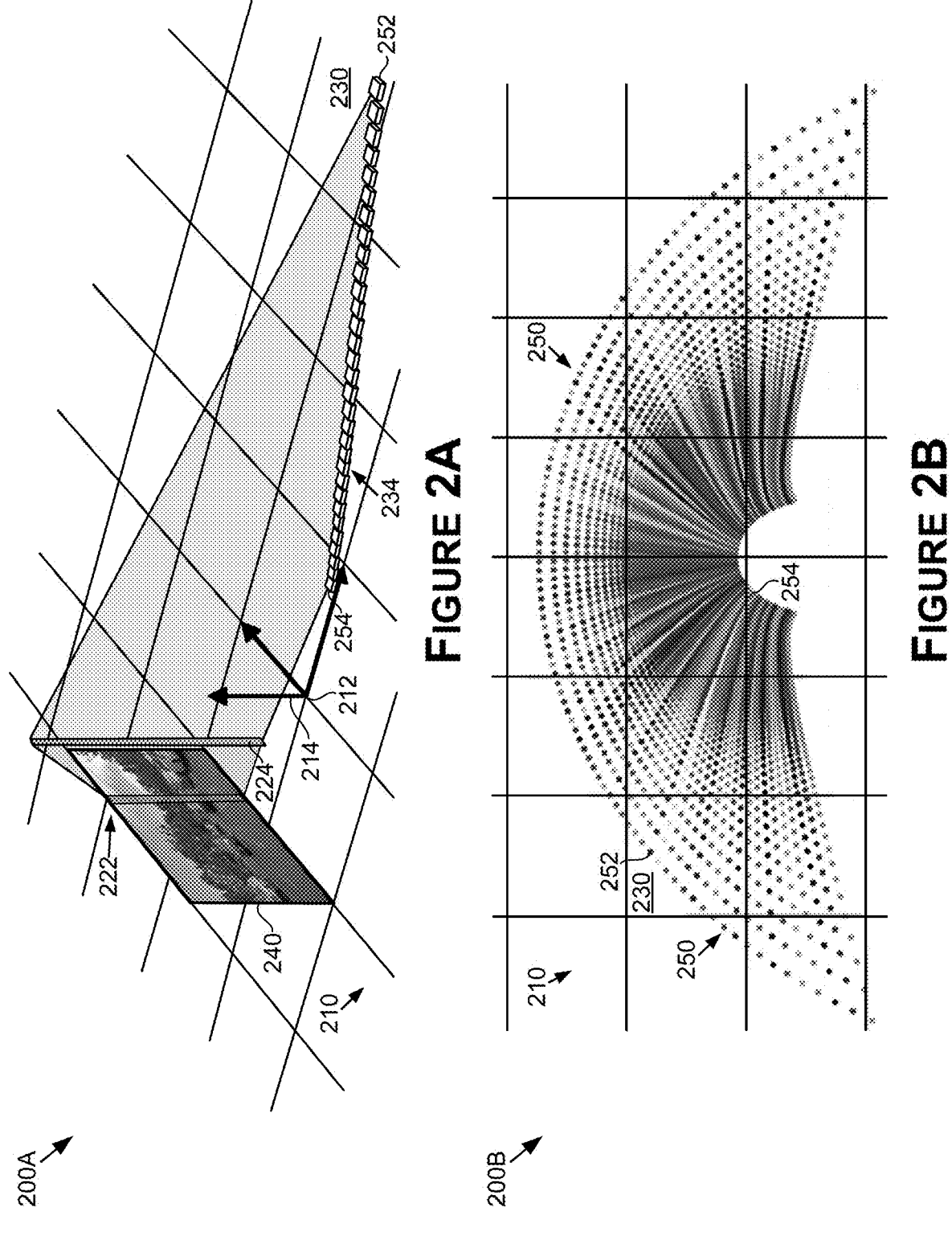
FIG. 2A is a perspective view illustrating examples of a set of transformed features corresponding to a field of view of a sensor scattered onto a Bird's-Eye-View (BEV) plane, in accordance with some embodiments of the present disclosure.
FIG. 2B is a BEV illustrating examples of projections of pixels corresponding to a field of view of a sensor, in accordance with some embodiments of the present disclosure.

In at least one embodiment, the perspective transformer 104 transforms the image features 122 with respect to one or more planes. In various examples, a BEV plane is described, however, one or more other planes may be used. Referring now to FIG. 2A, FIG. 2A is a perspective view 200A illustrating examples of a set of transformed features 224 corresponding to a field of view of a sensor scattered onto a Bird's-Eye-View (BEV) plane 210, in accordance with some embodiments of the present disclosure. Where a BEV plane is used, the BEV plane may, for example, pass through a reference point(s) with respect to the vehicle 700 and have a reference orientation with respect to the vehicle 700. By way of example, and not limitation, a rig center 212 of the vehicle 700 may be used as a reference point and the reference orientation may be configured such that the BEV plane is orthogonal to the Z axis 214. As described herein, in some embodiments, orientations other than BEV may be used to generate a plane, values, etc.

In at least one embodiment, the perspective transformer 104 may discretize the BEV plane into regions and the transformed features 124 may be associated with one or more particular regions of the BEV plane. For example, the BEV plane 210 is shown as being discretized into a grid $G^{bev}$ of dimensions $W^{bev} \times H^{bev}$ where $W^{bev}$ may refer to a grid width and $H^{bev}$ may refer to the grid height. As indicated in FIG. 2A, the perspective transformer 104 may transform a set of image features 222 into the set of transformed features 224. The set of image features 222 may correspond to a column of the image features 122 for a corresponding image and/or feature map. The set of transformed features 224 may correspond to the column of the image features 122 transformed into a BEV. While a column is shown and described, other regions or areas may be used for the transformations of the image features 222 into the transformed features 124.

As indicated in FIG. 2A, transformed features in the set of transformed features 224 are associated with (e.g., assigned to) particular grid cells of the BEV plane 210. In at least one embodiment, the perspective transformer 104 performs assignments of transformed features to grid cells for the perspective transformations based at least on the geometric relationship between row and column positions in an image plane 240 corresponding to an image feature map of the image features 122 and radial and angular positions in the BEV plane 210. Referring now to FIG. 2B with FIG. 2A, FIG. 2B is a BEV 200B illustrating examples of projections 250 of pixels corresponding to a field of view of a sensor, in accordance with some embodiments of the present disclosure. For example, a set of pixel (or cell or area) projections 234, of which a projection 252 and a projection 254 are individual labeled, may be used to assign corresponding transformed features into grid cells.

As indicated in FIGS. 2A and 2B, the perspective transformer 104 may assign a transformed feature corresponding to the projection 252 to a grid cell 230 of the grid $G^{bev}$ which at least partially contains the projection 252. The perspective transformer 104 may similarly, for each column and for each image, view, and/or feature map transform each column of the image features 122 into a corresponding set of transformed features 124 and assign the corresponding set of transformed features 124 to a grid cell of the BEV plane 210. As described herein, the feature fuser 106 may use the assignments to fuse the transformed features 124 into the fused features 126. For example, the feature fuser 106 may fuse the transformed features 124 into a BEV feature map $F_{bev}$ having cells corresponding to the grid cells of the grid $G^{bev}$.

In at least one embodiment, the perspective transformer 104 computes the transformed features 124 using one or more perspective transformation functions $B(\cdot)$, then scatters the transformed features 124 onto the BEV plane 210. For example, the perspective transformer 104 may compute the transformed features 124 using one or more MLMs, such as a multilayer perceptron (MLP) network, that learn the function $B(\cdot)$. In at least one embodiment, the function $B(\cdot)$ is modeled using an MLP block with only one hidden layer, and the MLP parameters may not be shared by different image columns. MLP layers may the capability to encode global contextual information with respect to an input region, such as a column. This capability may enhance the ability of the MLP to learn a version of the function $B(\cdot)$ that corresponds to the correct BEV positions without depth information, as objects may appear at different heights. While an MLP is described, other types of MLMs may be used in addition to or alternatively from an MLP, such as one or more transformer networks. However, a transformer network may be slower than an MLP, which may result in latency that impacts real-time performance, such as for performing ADAS operations.

In at least one embodiment, and as indicated in FIG. 2B, the perspective transformer 104 computes the projections 250 using polynomial curves projecting from individual image plane columns on the BEV plane 210. Computing projections using polynomial curves may accurately model distortion due to camera or sensor intrinsic attributes. In at least one embodiment, the perspective transformer 104 projects, for an image column $I^c$, each pixel location $d_i=[u_i, v_i]\in I^c$ onto the BEV plane 210 using sensor calibrations 140 (corresponding to camera intrinsic attributes), and converts the projections to polar coordinates, resulting in a list of BEV points $\{b_i=[a_i, d_i]\}$. The perspective transformer 104 may fit a polynomial curve $a=f^c(d)$ to the BEV points. The perspective transformer 104 may use the polynomial curve to infer an angular position given any radial position per each image column $I^c$.

Given a maximum detection range r for a sensor (e.g., in meters), the range $[o,r]$ may be discretized into $\hat{h}$ (e.g., logarithmically spaced) bins. The corresponding features of the image column $I^c$ may be represented as $$F^c_{polar}$$

with dimensions h×C. The function $B(\cdot)$ may be defined such that $$F^c_{polar} = B(F^c_{cam}).$$

The feature fuser 106 may aggregate $$F^c_{polar}$$

with dimensions h×C into the global BEV feature map $F_{bev}$. The features $$F^c_{polar}$$

may have the same number of radial distance bins $\hat{h}$, such that each cell in $$F^c_{polar}$$

corresponds to a radial distance bin, from which the perspective transformer 104 may sample multiple depth values and compute the corresponding angular values using the fitted polynomial function $f^c(\cdot)$. For computational efficiency, the perspective transformer 104 may sample, by way of example, and not limitation, one depth value per radial distance bin. Thus, for each cell in the features $$F^c_{polar},$$

an exact location in the grid $G^{bev}$ can be pre-computed and stored in a lookup table for efficient training and inference.

FIG. 2B illustrates an example of how the prospective transformer 104 may transform the image features 122 into the BEV plane 210. The prospective transformer 104 may perform the same or a similar procedure for every column and every image, while adapting the polynomial curves to the intrinsic aspects of the sensors. FIG. 2B shows an example of projections corresponding to 200 degree field of view camera. While example operations of the prospective transformer 104 have been described, in at least one embodiment, other approaches may be used to transform the image features 122 to transformed features 124 and/or to assign the transformed features 124 to one or more bins or cells for use by the feature fuser 106.

In fusing the transformed features 124 to generate the fused features 126, the feature fuser 106 multiple transformed features 124 may be assigned and/or mapped to the same grid cell and/or BEV feature map cell. Rather than concatenating the BEV features maps for different images, the feature fuser 106 may combine the commonly mapped features, such as by using a sum operation and/or other statistical operation. Combining one or more of the mapped features may increase the robustness of the process 100 to camera dropout as the number of BEV feature maps may be invariant to the number of active senor inputs or channels.

The resolution of the grid $G^{bev}$ may impact perception range and perception accuracy using the fused features 126. For autonomous driving, it may be desirable to, for example, detect obstacles or objects up to 200 meters. A cartesian grid with 0.25 meters per cell results in a 1600×1600 grid, which may be both memory intensive and computationally expensive to implement. Thus, using a cartesian grid for some applications, such as autonomous driving, may prohibit the training and deployment of deep neural networks. In practice, a higher resolution may be more useful for close ranges with respect to the vehicle 700 compared to farther rangers.

Thus, in at least one embodiment, the grid $G^{bev}$ may be defined as an irregular grid having non-uniform cell or bin sizes. In at least one embodiment, one or more portions of the grid $G^{bev}$ may be configured to increase in cell size relative to a distance of a cell from the reference point(s) corresponding to the vehicle 700 (or otherwise have one or more cell sizes corresponding to the reference point). For example, an irregular grid $G^{bev}$ may be defined using polar coordinates in which $W^{bev}$ may refer to the number of angular samples ranging from 0 to 360, and $H^{bev}$ may refer to the number of depth samples. For example, with 1 degree of angular resolution and log depth space, the BEV plane 210 may be represented using a 360×64 grid, rather than the 1600×1600 grid.

As described herein, the MLMs 108 may be configured to use the fused features 126 to generate output data, such as the output data 128. In at least one embodiment, the MLMs 108 include one or more MLMs to extract high-level features $\hat{F}^{bev}$ from the fused features 126 (e.g., a fused BEV feature map corresponding to each of the image features 122). For example, a CNN backbone may be used to extract the high-level features $\hat{F}^{bev}$. In at least one embodiment, the high-level features $\hat{F}^{bev}$ may be consumed by one or more downstream perception modules. For example, the MLMs 108 may include one or more 3D detection heads for performing perception operations and/or tasks using the high-level features $\hat{F}^{bev}$.

Non-limiting examples of perception tasks that may be performed using the fused features 126 include one or more of object detection, parking space detection, freespace detection, lane detection, semantic segmentation, instance segmentation, traffic sign and signal recognition, vehicle tracking, pedestrian tracking, object classification, obstacle avoidance, localization, road boundary detection, lane change detection, road anomaly detection, road surface condition assessment, crosswalk detection, trajectory prediction, scene understanding, parking lot occupancy detection, collision detection and avoidance, speed estimation, human gesture recognition, emotion recognition, facial expression recognition, human pose estimation, voice/speech recognition, object grasping detection, object manipulation detection, object affordance recognition, object shape estimation, depth estimation, 3D reconstruction, scene reconstruction, event detection, object tracking in 3D, object orientation estimation, gaze detection, attention modeling, human activity recognition, object counting, object size estimation, object shape classification, object texture analysis, object material recognition, sound source localization, sound classification, odometry estimation, egomotion estimation, body part detection, object interaction detection, texture segmentation, saliency detection, abnormal event detection, self-localization, mapping, loop closure detection, point cloud registration, visual odometry, crowd density estimation, crowd behavior analysis, path planning, path following, map exploration, or map interpretation.

Examples of Perception Tasks

In at least one embodiment, the fused features 126 may be applied to the MLMs 108 to localize, classify, and estimate dimensions and orientations of objects in 3D space. Each object may be represented by a category and 3D cuboid. In at least one embodiment, a 3D cuboid may have 9 degrees-of-freedom (DOF) and may be defined by a position [r,a,e], dimensions [$d_x$,$d_y$,$d_z$], and an orientation matrix $R \in \mathbb{R}^{3 \times 3}$. In at least one embodiment, the dimensions and orientations may be determined without requiring Non-Maximum Suppression (NMS) post-processing. For each scene, $$G = \{g_i\}_{i=1}^{K}$$

may refer to a set of K ground-truth objects, and $$P = \{d_i\}_{i=1}^{\hat{K}}$$

may refer to a set of $\hat{K}$ predicted outputs. The training loss for the MLMs 108 may be computed based at least on finding a one-to-one matching between G and P. A final loss may be computed based at least on the matching result. The set of positive object candidates matched to the ground truth objects may be referred to as $P_{pos}$ and the set of negative objects may be referred to as $P_{neg}$. The training loss may then be defined in accordance with Equation (1):

$$L_{obs}(G, P) = \sum\nolimits_{d_t \in P_{pos}} L(g_i + d_i) + \sum\nolimits_{d_t \in P_{neg}} L(d_i), \quad (1)$$

where $L(g_i+d_i)$ and $L(d_i)$ may refer to loss functions for each predicted candidate. If $d_i$ is a negative candidate, the loss function $L(d_i)$ may include a (focal) binary cross-entropy loss—pulling an objectness score to zero. If $d_i$ is a positive candidate, the loss function $L(g_i+d_i)$ may capture classification and regression losses.

Figure 3:
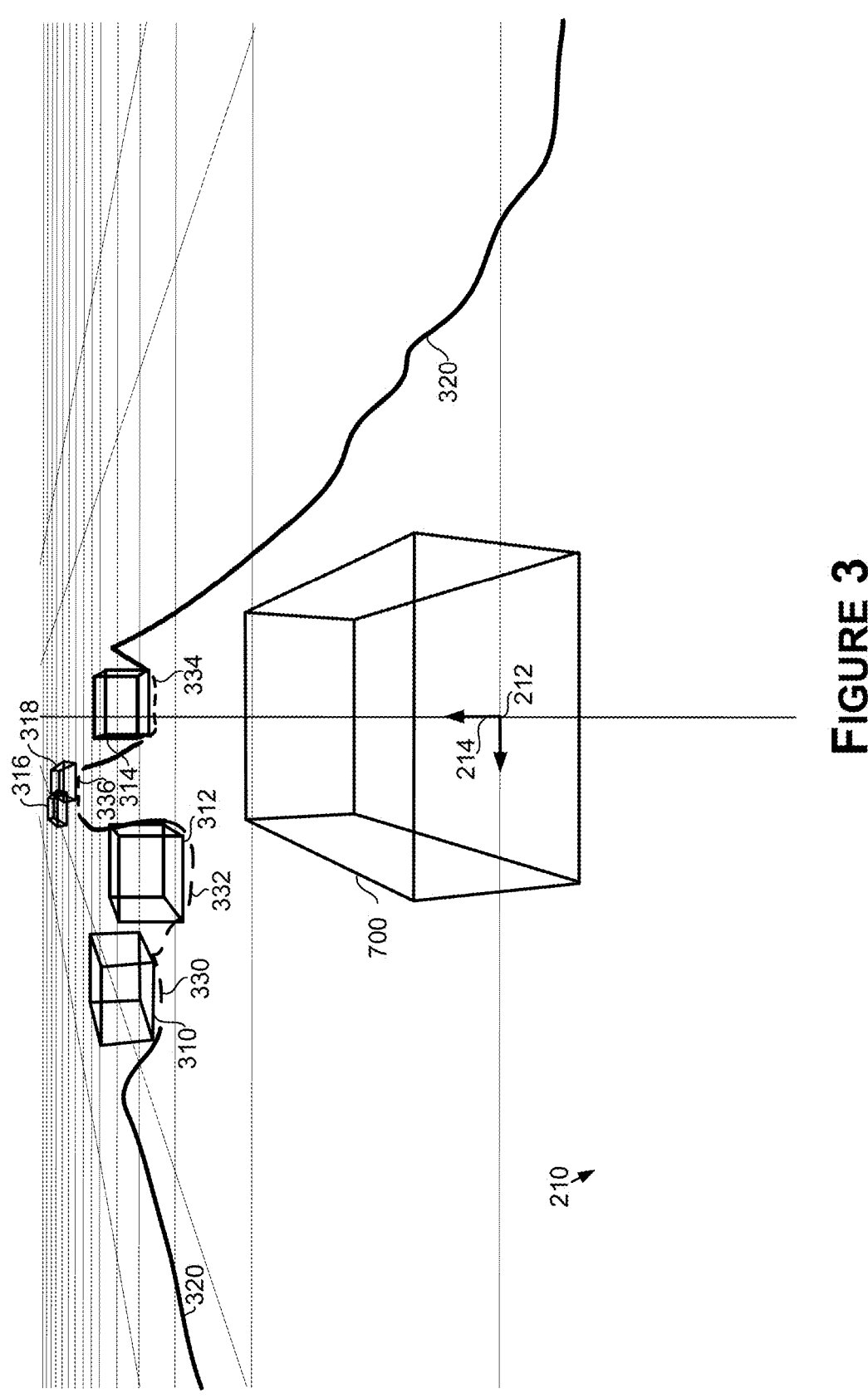
FIG. 3 is a perspective view illustrating examples of object detections and freespace predictions made using fused features corresponding to a BEV plane, in accordance with some embodiments of the present disclosure.

In at least one embodiment, the classification loss may include a (focal) cross-entropy loss. The regression loss $L^{reg}(g_i,d_i)$ may be based at least on decomposing the 3D regression loss into position (e.g., location) loss $L^{loc}(g_i,d_i)$, shape (e.g., size) loss $L^{size}(g_i,d_i)$, and orientation (e.g., rotation) loss $L^{rot}(g_i,d_i)$, for example, in accordance with Equation (2):

$$L^{reg}(g_i, d_i) = L^{loc}(g_i, d_i) + L^{size}(g_i, d_i) + L^{rot}(g_i, d_i) \quad (2)$$

where $$L^{loc}(g_i, d_i) = \frac{|g_i^r - d_i^r|}{\sigma^r} + \frac{|g_i^a - d_i^a|}{\sigma^a} + \frac{|g_i^e - d_i^e|}{\sigma^e}, \quad (3)$$

$$L^{size}(g_i, d_i) = \frac{1}{\sigma^s} \prod\nolimits_{d \in \{d_x, d_y, d_z\}} \frac{\min(g_i^d, d_i^d)}{\max(g_i^d, d_i^d)} + \log(2\sigma^s), \text{ and} \quad (4)$$

$$L^{rot}(g_i, d_i) = \frac{1}{\sigma^o} \sum\nolimits_{r \in R} |g_i^r - d_i^r| + \log(2\sigma^o), \quad (5)$$

where $\sigma^r$, $\sigma_a$, $\sigma^e$, $\sigma^s$, and $\sigma^o$ may refer to uncertainty values for position, shape, and orientation respectively, which may be predicted by the MLM(s) 108. Referring now to FIG. 3, FIG. 3 is a perspective view 300 illustrating examples of object detections 310, 312, 314, 316, and 318 and freespace predictions 320 made using the fused features 126 corresponding to the BEV plane 210, in accordance with some embodiments of the present disclosure. For example, the object detections 310, 312, 314, 316, and 318 may be made in accordance with Equations (1)-(5).

In at least one embodiment, LIDAR data may be used to generate ground truth for the 3D cuboids and/or 3D bounding shapes. To provide ground truth for objects outside of LIDAR range (e.g., 300 meters), the bounding shapes may be labeled in image space using 2D bounding shapes. To train the MLM(s) 108, the predicted 3D bounding shapes may be projected into image space to determine corresponding predicted 2D bounding shapes, which may be compared to the ground truth 2D bounding shapes for updating the parameters of the MLM(s) 108.

In at least one embodiment, the fused features 126 may be applied to the MLMs 108 to detect one or more drivable regions (or freespace(s)) in 3D space, for example, for use by a down-stream behavior planner to plan a safe trajectory for the vehicle 700. In at least one embodiment, the MLMs 108 learn a Radial Distance Map (RDM) representation of a drivable region, or freespace (e.g., defined using the freespace predictions 320 in FIG. 3). While polygons may be used to label 3D freespace, an RDM representation may be more efficient. In at least one embodiment, the MLM(s) 108 learn to predict an RDM including equirectangular bins to denote spatial locations. Additionally, or alternatively, the MLM(s) 108 may learn to predict (e.g., for each angular bin) boundary semantic labels, or classes, such as vehicle, Vulnerable Road User (VRU), and more. For example, FIG. 3 indicates semantic labels 330, 332, 334, and 336, which may correspond to vehicle labels. In at least one embodiment, each freespace ground truth label may be denoted as (r,c), where r may refer to a radial distance vector, and c may refer to a boundary semantic vector.

To train the MLM(s) 108 for freespace detection, for each scene, let $G=(r,c)$ refer to the ground-truth, and let $P=(\hat{r}, \hat{c})$, refer to the prediction. The loss function for the 3D freespace detection task may then by defined in accordance with Equations (6) and (7):

$$L_{fsp}(G, P) = L_{fsp}^{reg}(\hat{r}, r) + L_{fsp}^{cls}(\hat{c}, c), \text{ and} \tag{6}$$

$$L_{fsp}^{reg}(\hat{r}, r) = L_{fsp}^{iou}(\hat{r}, r) + L_{fsp}^{sim}(\hat{r}, r), \tag{7}$$

where $$L_{fsp}^{reg}(\hat{r}, r)$$

may refer to the regression loss which may be a combination of radius loss $$L_{fsp}^{iou}(\hat{r}, r)$$

and the similarity loss $$L_{fsp}^{sim}(\hat{r}, r), \text{ and } L_{fsp}^{cls}(\hat{c}, c)$$

may refer to the classification loss. The radius loss $$L_{fsp}^{iou}(\hat{r}, r)$$

may include a polar intersection-over-union loss (IoU) and may be computed between the prediction and ground truth labels, for example, in accordance with Equation (8):

$$L_{fsp}^{iou}(\hat{r}, r) = \sum_{i=1}^{N_{bins}} \frac{\min(r_i, \hat{r}_i)}{\max(r_i, \hat{r}_i)}. \tag{8}$$

The similarity loss $$L_{fsp}^{sim}(\hat{r}, r)$$

may be computed between line segments formed, at least in part, by joining the end points from the consecutive angular bins in the prediction and ground truth labels to reduce the noise in the predicted RDM. The similarity loss $$L_{fsp}^{sim}(\hat{r}, r)$$

may be computed in accordance with Equation (9):

$$L_{fsp}^{sim}(\hat{r}, r) = \sum_{i=1}^{N_{bins}} \left(1.0 - \frac{\hat{l}_i^{i+1} \cdot l_i^{i+1}}{\|\hat{l}_i^{i+1}\| \| l_i^{i+1}\|}\right), \tag{9}$$

where $$\hat{l}_i^{i+1}$$

may refer to the line segments formed, at least in part, by joining the end points of $\hat{r}_i$ and $$\hat{r}_{i+1}, \text{ and } l_i^{i+1}$$

being defined similarly. The classification loss $$L_{fsp}^{cls}(\hat{c}, c)$$

may be defined using a focal loss.

In at least one embodiment, the fused features 126 may be applied to the MLMs 108 to localize and classify 3D parking spaces. For simplicity, a flat-world model may be assumed where the ground plane may be at height zero with respect to the vehicle 700. Therefore, each parking space may be represented using a 2D shape, such as an oriented rectangle, which may be parameterized using $[cx,cy,l,w,\theta]$, where cx and cy may refer to the center coordinates of the shape, l and w may refer to the length and width of the shape in meters, respectively, and $\theta$ may refer to the orientation of the shape (e.g., yaw angle in radians) in the range $[\theta,\pi]$. Where the shape corresponds to a box, the box oriented at $\pi$ may visually appear the same as a box oriented at 0. Thus, in at least one embodiment, the orientation value $\theta$ need not cover the entire angular range of $[0,2\pi]$. In at least one embodiment, a parking space prediction output using the MLM(s) 108 may be assigned a profile and/or class label, example of which include angled, parallel, or perpendicular.

In at least one embodiment, parking space detection may be implemented using a similar approach (e.g., head, training strategy, and losses) as described herein with respect to object detection. However, the regression loss function may be simpler than the regression loss function for objection detection and may be defined in accordance with Equation (10):

$$L_{prk}^{reg}(g_i, d_i) = \sum_{s \in \{cx, cy, l, w, \theta\}} (g_i^s - d_i^s)^2. \tag{10}$$

Referring now to FIG. 4, FIG. 4 is a BEV 400 illustrating examples of parking space predictions 410 made using the fused features 126 corresponding to the BEV plane 210, in accordance with some embodiments of the present disclosure. The parking space predictions 410 may, for example, be determined using the MLM(s) 108, as described herein.

The process 100 may be implemented using a multi-task network which jointly learns multiple tasks, such as any combination of the various tasks described herein, simultaneously. At least some of the tasks learned by the multi-task network may be inherently different from one another in nature and one training approach may not be optimal for all of the tasks. Further, different losses for different tasks may have different landscapes, in which case a linear combination of various loss components with equal weights may lead to under representation of certain tasks or a subset of tasks may dominate the loss.

In at least one embodiment, the total training loss $L_{total}$, for a given batch b, may be defined in accordance with Equation (11):

$$L_{total} = \sum_{t=1}^{T} w_t L_t^b, \tag{11}$$

where T may refer to the number of tasks, $w_t$ may refer to a task weight assigned to task t, and $$L_t^b$$

may refer to the loss for task t given training batch b. A weighting algorithm may be used to dynamically update the loss weights $$\{w_t\}_{t=1}^{T}$$

that are assigned to each loss component. Given a dataset with S samples, $L_{t,s}$ may refer to the loss of task t evaluated on training sample s. In at least one embodiment, not all training samples in the dataset contain ground-truth labels for all of the tasks. In at least one embodiment, the task loss for such cases may be set to zero (and the gradient may be ignored to the task during back-propagation). In at least one embodiment, at each epoch, the loss sum map be calculated for each task t, over the training samples, and the loss weight $w_t$ may be based at least on an inverse of the loss sum scaled based at least on a task loss prior $c_t$, in accordance with Equation (12):

$$L_t = \sum_{s=1}^{S} L_{t,s}, w_t = \frac{c_t}{L_t}, w_t = \frac{w_t}{\sum_{t=1}^{T} w_t}, \tag{12}$$

where $c_t$ may refer to a configurable loss multiplier for task t that can be used to boost or reduce a task's loss. Thus, in at least one embodiment, losses may be scaled based at least on the inverse of loss sums, which may result in the losses being at similar scale, thereby reducing any gaps between gradient magnitudes. Further, the loss multiplier $\{c_t\}$ may be useful when certain tasks are more important than other and/or are more difficult to learn. In at least one embodiment, a first epoch, the task loss weights $$\{w_t\}_{t=1}^{T}$$

may be set manually (e.g., $w_t=1$ for $t \in [1,T]$) as the loss sum statistics are unavailable from a previous epoch, and $w_t$ may be updated after each epoch. In at least one embodiment, a multi-stage approach may be used where all $\{c_t\}$ are set to 1. Then the multi-task results may be compared to single task results, and $\{c_t\}$ may be inferred accordingly based at least on Key Performance Indicator (KPI) improvements and/or regressions. Using the determined $\{c_t\}$, the multi-task network may be retrained in subsequent training trials.

Now referring to FIGS. 5 and 6, each block of method 500, method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the process 100 of FIG. 1. However, these methods may additionally or alternatively be executed by any one system, or any combination of systems, including, but not limited to, those described herein.

FIG. 5 is a flow diagram showing a method 500 for surround scene perception based at least on generating a BEV feature map corresponding to BEV features values transformed from feature values corresponding to multiple views, in accordance with some embodiments of the present disclosure. The method 500, at block B502, includes transforming first feature values corresponding to a first view into one or more first BEV feature values. For example, the perceptive transformer(s) 104 may transform one or more of the image features 122 corresponding to the view 132 of an environment into one or more of the transformed features 124 corresponding to a BEV of the environment.

At block B504, the method 500 includes transforming second feature values corresponding to a second view into one or more second BEV feature values. For example, the perceptive transformer(s) 104 may transform one or more of the image features 122 corresponding to a view 134 of the environment into one or more of the transformed features 124 corresponding to the BEV of the environment.

At block B506, the method 500 includes generating, using the one or more first feature values and the one or more second feature values, one or more BEV feature maps. For example, the feature fuser 106 may generate, using BEV feature values corresponding to at least the views 132 and 134, a BEV feature map corresponding to the fused features 126 based at least on relative positions of the view 132 and the view 134 in the environment.

At block B508, the method 500 includes performing one or more operations using the one or more BEV features maps. For example, the vehicle 700 may perform, using the MLM(s) 108 and based at least on the one or more BEV feature maps, one or more operations for the vehicle 700.

FIG. 6 is a flow diagram showing a method 600 for surround scene perception based at least on projecting BEV features values converted from feature values corresponding to multiple views to determine a BEV feature map, in accordance with some embodiments of the present disclosure. The method 600, at block B602, includes converting feature values corresponding to a plurality of views into BEV feature values. For example, the perceptive transformer(s) 104 may convert the image features 122 corresponding to a plurality of views of an environment into the transformed features 124 corresponding to a BEV of the environment.

At block B604, the method 600 includes projecting one or more portions of the plurality of views into one or more bins corresponding to one or more BEV feature maps. For example, the perceptive transformer(s) 104 may project one or more portions of the plurality of views (e.g., a column of the image features 122), into one or more bins (e.g., including a bin corresponding to a grid cell 230) corresponding to a BEV feature map corresponding to the fused features 126 based at least on relative positions of the plurality of views in the environment.

At block B606, the method 600 includes determining, using the BEV feature values, one or more BEV feature values for the one or more BEV feature maps based at least on the projecting. For example, the feature fuser 106 may determine, using the BEV feature values, one or more BEV feature values for the one or more BEV feature maps based at least on the projecting.

At block B608, the method 600 includes generating, using the one or more first feature values and the one or more second feature values, one or more BEV feature maps. For example, the feature fuser 106 may generate, using BEV feature values corresponding to at least the views 132 and 134, a BEV feature map corresponding to the fused features 126 based at least on relative positions of the view 132 and the view 134 in the environment.

At block B608, the method 600 includes performing one or more operations using the one or more BEV features maps. For example, the vehicle 700 may perform, using the MLM(s) 108 and based at least on the one or more BEV feature maps, one or more operations for the vehicle 700.

Example Autonomous Vehicle

Figure 7A:
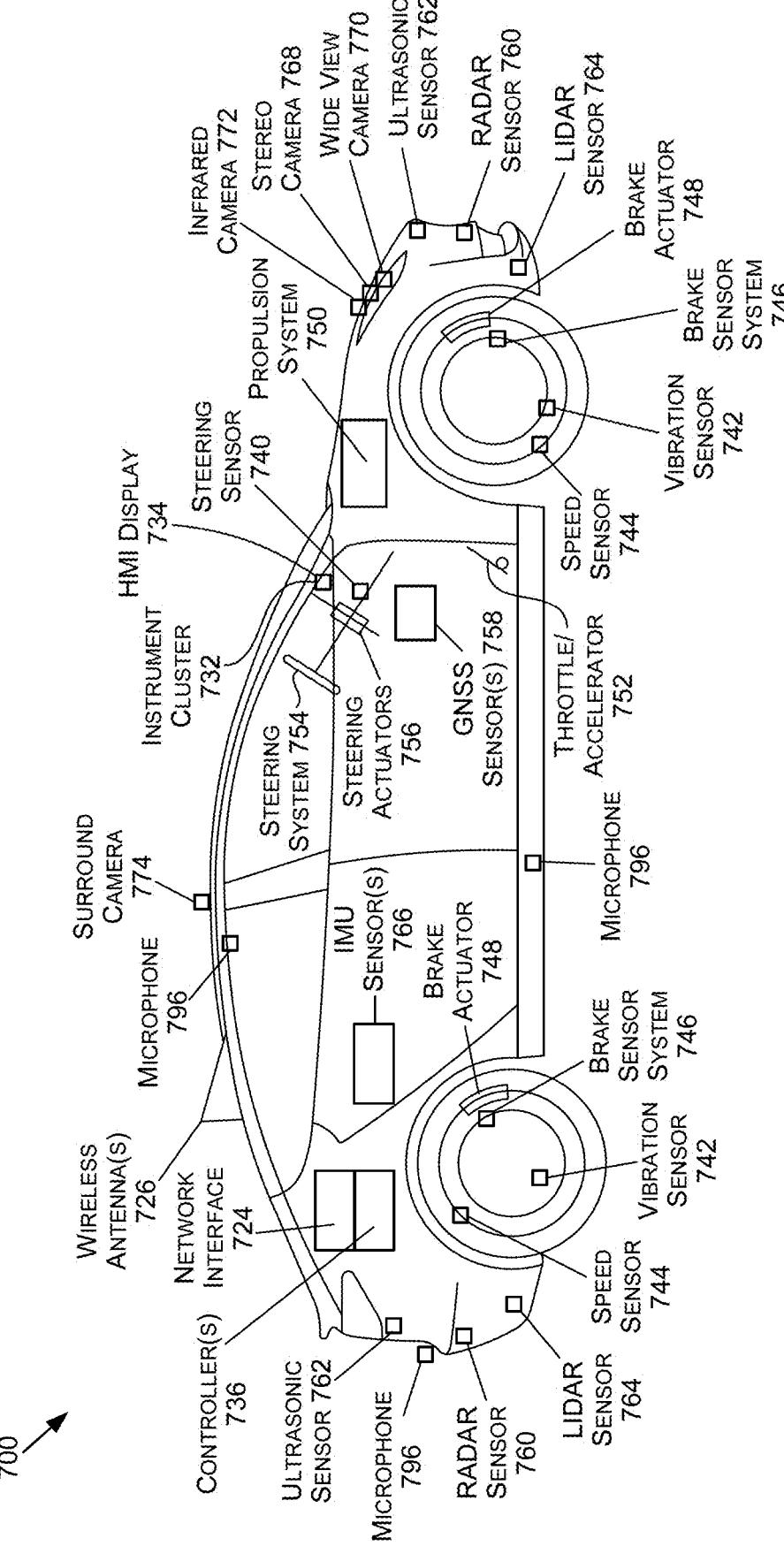
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
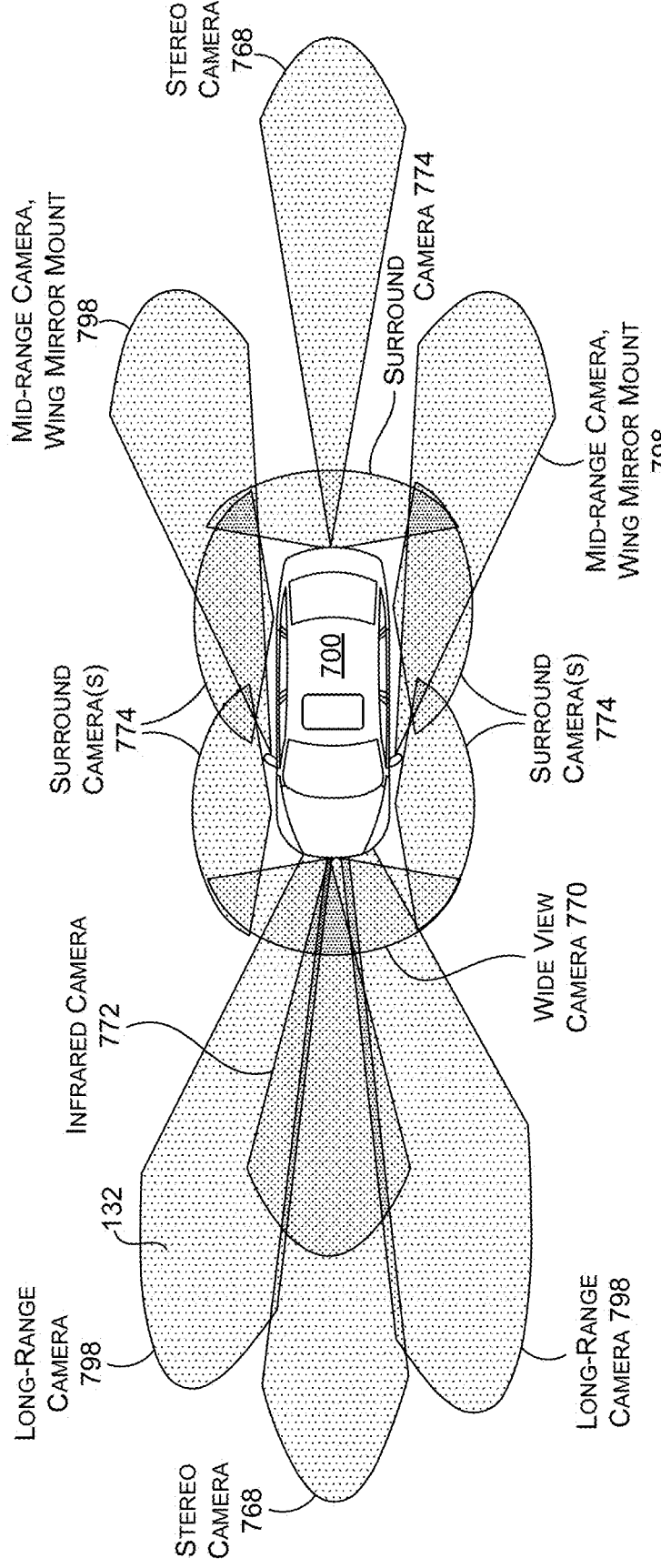
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
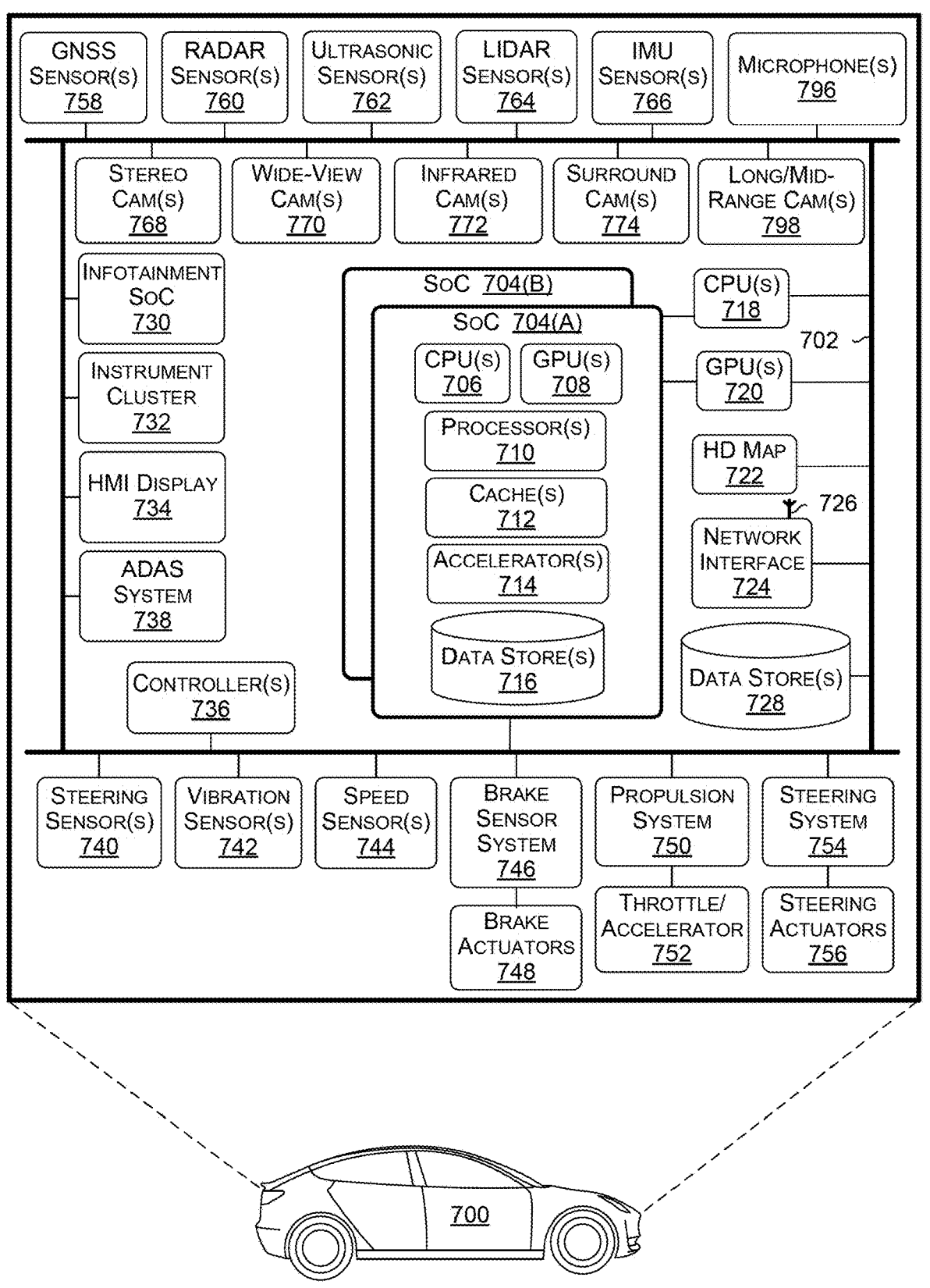
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR CORES for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types— for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning).

Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
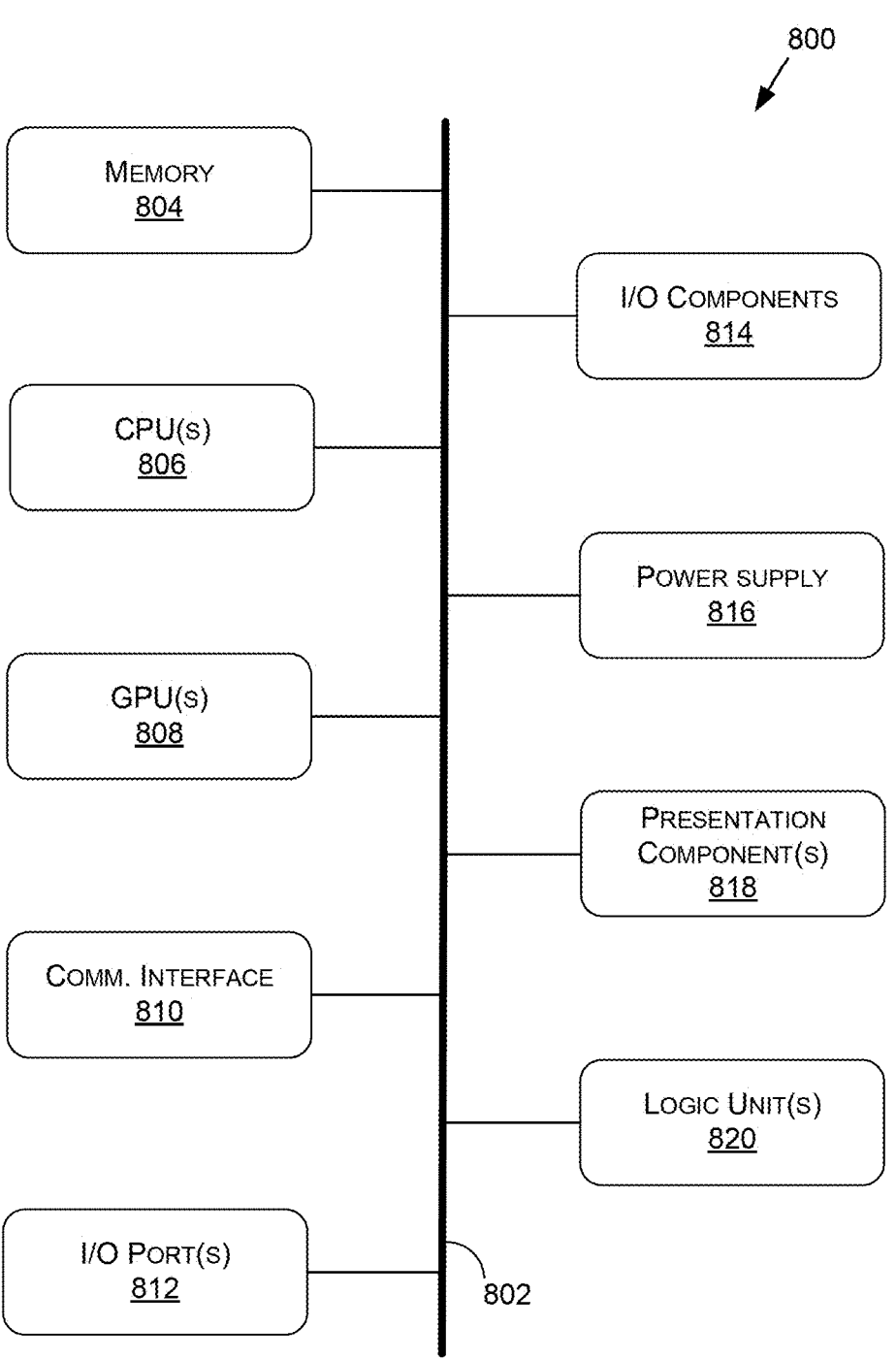
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
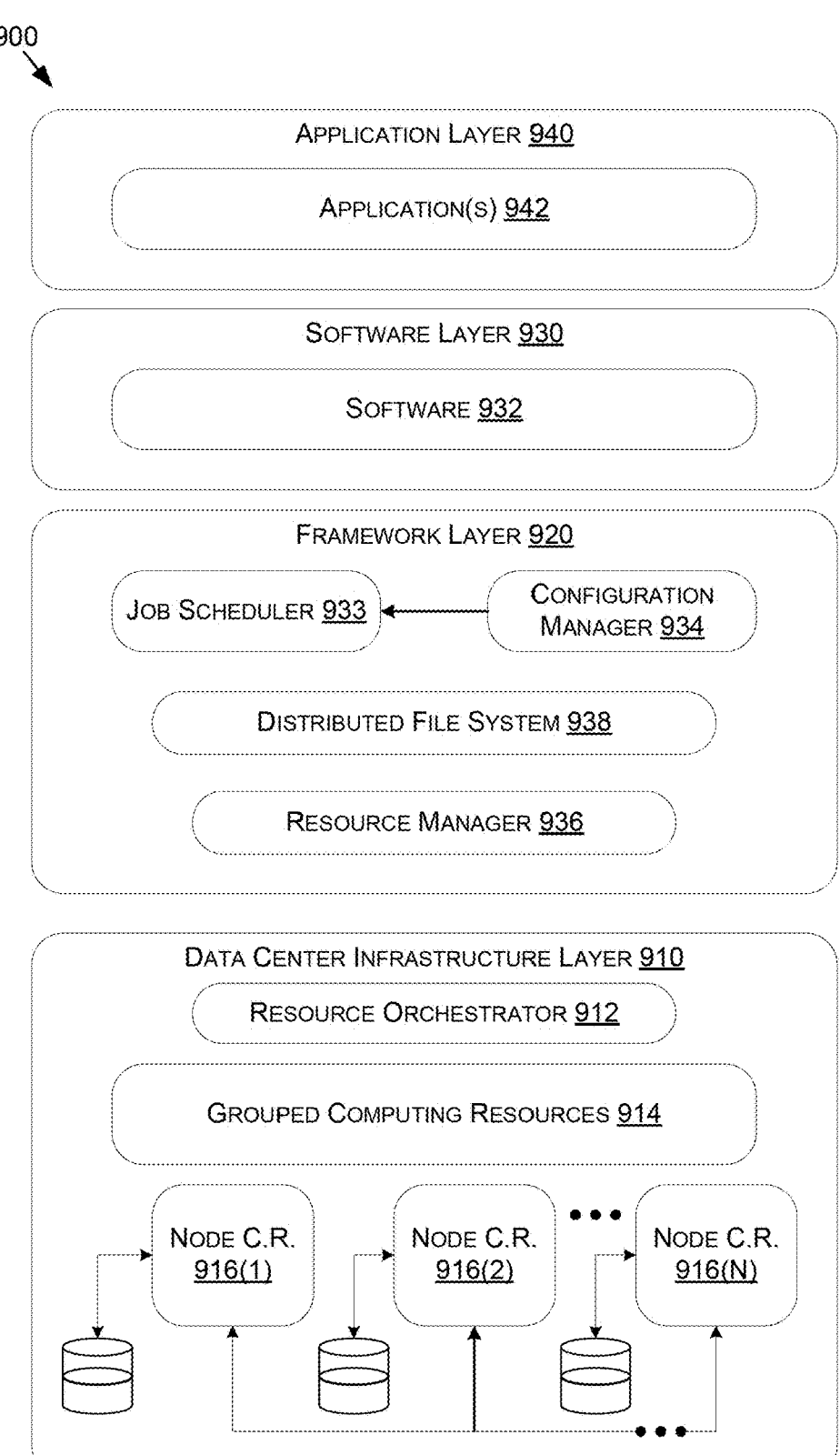
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   transforming one or more first feature values corresponding to a first perspective view of an environment into one or more first transformed feature values corresponding to a common perspective of the environment;
   transforming one or more second feature values corresponding to a second perspective view of the environment into one or more second transformed feature values corresponding to the common perspective of the environment;
   assigning the one or more first transformed feature values and the one or more second transformed feature values to one or more bins corresponding to one or more feature maps of the environment based at least on performing one or more perspective transformations using geometric relationships between positions in the first perspective view and the second perspective view and positions in the one or more feature maps; and
   performing, using one or more machine learning models (MLMs) and based at least on the one or more feature maps, one or more operations for a machine.

2. The method of claim 1, further comprising:
   computing a statistical combination of at least one of the one or more first transformed feature values and at least one of the one or more second transformed feature values; and
   determining one or more combined feature values of the one or more feature maps using the statistical combination.

3. The method of claim 1, wherein the assigning is of at least one of the one or more first transformed feature values and at least one of the one or more second transformed feature values into a same bin of the one or more bins.

4. The method of claim 1, wherein the one or more perspective transformations includes fitting one or more curves to one or more portions of the one or more first transformed feature values and the one or more second transformed feature values.

5. The method of claim 1, wherein the one or more bins include one or more radial bins corresponding to the one or more feature maps.

6. The method of claim 1, wherein the one or more first feature values comprise one or more first two-dimensional (2D) image features of a first 2D image map obtained using a first image corresponding to the first perspective view and the one or more second feature values comprise one or more second 2D image features of a second 2D image map obtained using a second image corresponding to the second perspective view.

7. The method of claim 1, wherein the transforming the one or more first feature values into the one or more first transformed feature values includes applying the one or more first feature values to one or more second MLMs that encode global contextual information for one or more columns corresponding to the first perspective view and the one or more first feature values.

8. The method of claim 1, wherein the one or more MLMs are trained to detect, using the one or more feature maps, one or more of: objects, parking spaces, or freespace in the environment.

9. A system comprising:
one or more processors to perform operations including:
converting feature values corresponding to a plurality of views of an environment into Bird's-Eye View (BEV) feature values corresponding to a BEV of the environment;
assigning the BEV feature values to one or more bins corresponding to one or more BEV feature maps based at least on performing one or more perspective transformations using geometric relationships between positions in the plurality of views and positions in the one or more BEV feature maps;
determining, using the BEV feature values, one or more BEV feature values for the one or more BEV feature maps based at least on the assigning; and
determining, using one or more machine learning models (MLMs) and based at least on the one or more BEV feature maps, one or more operations for a machine.

10. The system of claim 9, wherein the determining the one or more BEV feature values includes:
computing a statistical combination of a group of the BEV feature values based at least on the group of BEV feature values being geometrically projected into at least one same bin of the one or more bins; and
determining the one or more BEV feature values using the statistical combination.

11. The system of claim 9, wherein the one or more bins include one or more radial bins corresponding to the one or more BEV feature maps.

12. The system of claim 9, wherein the one or more perspective transformations includes fitting one or more polynomial curves to one or more portions of the BEV feature values.

13. The system of claim 9, wherein the feature values comprise one or more first two-dimensional (2D) image features of a first 2D image map generated using a first image corresponding to a first view of the plurality of views and one or more second 2D image features of a second 2D image map generated using a second image corresponding to a second view of the plurality of views.

14. The system of claim 9, wherein the converting includes applying a set of the feature values to one or more second MLMs that encode global contextual information for one or more columns corresponding to a view of the plurality of views and the set of the one or more BEV feature values.

15. The system of claim 9, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;

a system for performing collaborative content creation for 3D assets;
a system for performing deep learning operations;
a system implemented using an edge device;
a system implemented using a robot;
a system for performing generative AI operations;
a system for performing operations using a large language model;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

16. At least one processor comprising:
one or more circuits to perform one or more operations for a machine using one or more feature maps, the one or more feature maps being determined based at least on:
transforming feature values corresponding a plurality of perspective views of an environment into shared perspective feature values corresponding to a shared perspective of the environment, and
assigning the shared perspective feature values to one or more bins corresponding to the one or more feature maps based at least on one or more perspective transformations using geometric relationships between positions in the plurality of perspective views and positions in the one or more feature maps.

17. The at least one processor of claim 16, wherein the one or more feature maps are further determined based at least on:
computing a statistical combination of a group of the shared perspective feature values based at least on the group of the shared perspective feature values being geometrically projected into at least one same bin of one or more bins corresponding to the one or more feature maps; and
determining one or more shared perspective feature values for the one or more feature maps using the statistical combination.

18. The at least one processor of claim 17, wherein the group of the shared perspective feature values are projected into the at least one same bin based at least on fitting one or more curves to one or more portions of the shared perspective feature values.

19. The at least one processor of claim 16, wherein the one or more circuits are further to assign the shared perspective feature values to one or more radial bins corresponding to the one or more feature maps, wherein the one or more feature maps are determined based at least on the assigning.

20. The at least one processor of claim 16, wherein the at least one processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing generative AI operations;

a system for performing operations using a large language model;

a system for performing deep learning operations;

a system implemented using an edge device;

a system implemented using a robot;

a system for performing conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

\* \* \* \* \*